Aug. 16, 1966   P. W. FRANKLIN   3,267,353
DUPLEX GENERATOR FOR PROVIDING INDEPENDENTLY
REGULATED A.C. AND D.C. CURRENT OUTPUT
Filed Feb. 26, 1963   4 Sheets-Sheet 2

INVENTOR
Paul W. Franklin

BY *Stewart F. Moore*

ATTORNEYS

INVENTOR
Paul W. Franklin

BY *Stewart F. Moore*

ATTORNEYS

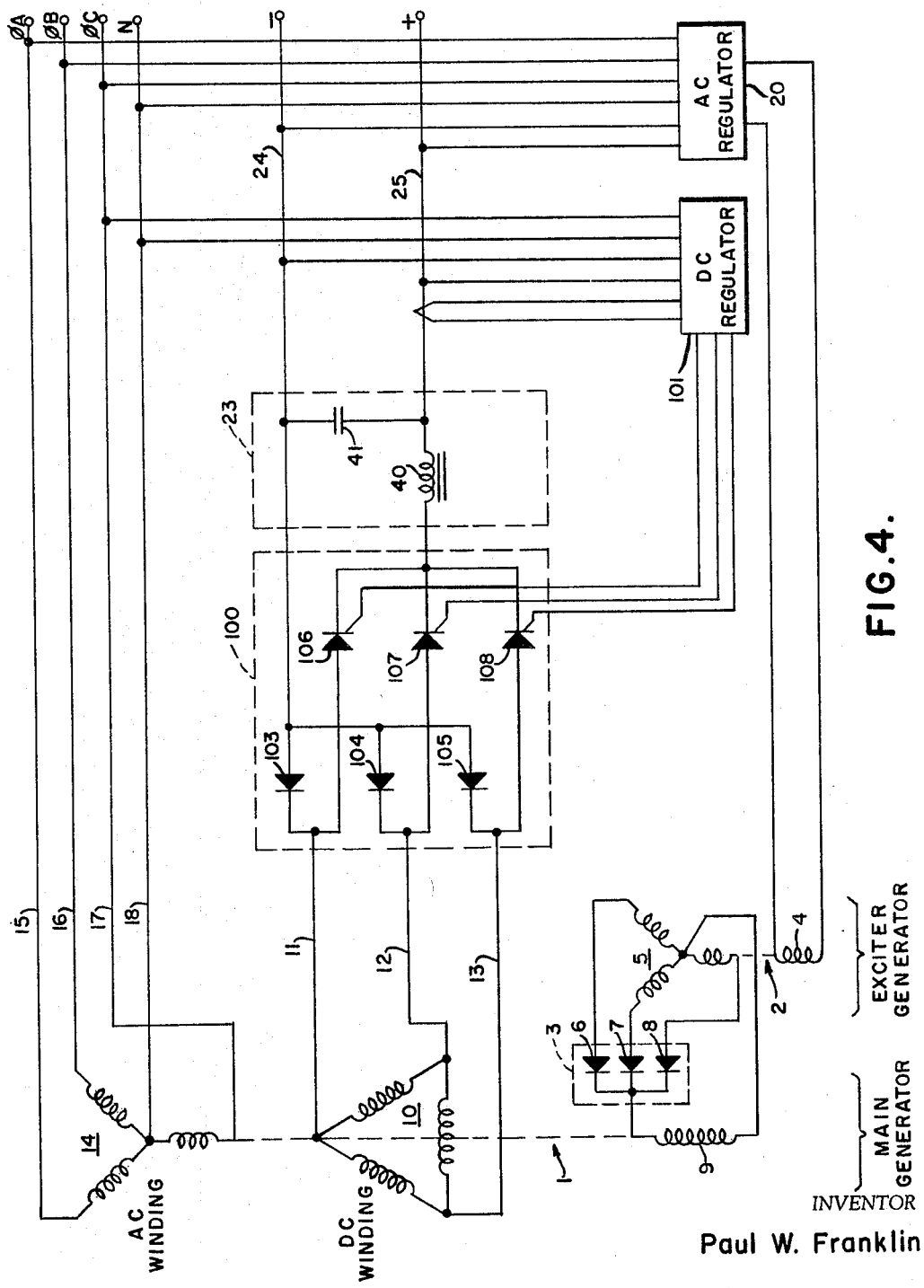

United States Patent Office 3,267,353
Patented August 16, 1966

3,267,353
DUPLEX GENERATOR FOR PROVIDING INDEPENDENTLY REGULATED A.C. AND D.C. CURRENT OUTPUT
Paul W. Franklin, Dayton, Ohio, assignor to American Machine & Foundry Company, a corporation of New Jersey
Filed Feb. 26, 1963, Ser. No. 261,067
8 Claims. (Cl. 322—90)

This invention relates to a duplex generator system and more particularly to such a system for providing independently regulated alternating current and direct current output.

It is often found necessary, particularly in aircraft installations, to have both a source of regulated alternating current and a source of regulated direct current. It has not been found practical to utilize a single regulated alternating current source and rectify and regulate a portion of this power to provide a direct current source, since this results in substantial distortion in the alternating current wave shape. Two completely separate generating systems would provide the independently regulated sources without wave shape distortion, but obviously such separate systems would be more expensive than a single combined magnetic structure.

Experience has shown that whenever an A.C. source is loaded by rectifiers, supplying D.C. current into a load, a strong, undesirable and objectionable deformation of the A.C. voltage and D.C. wave shape occurs. This deformation consists of the addition of lower A.C. voltage harmonics (such as second, third, fourth, etc.) and also instantaneous voltage spikes emanating from the basic A.C. voltage sinusoid as well as from the D.C. voltage envelope. For instance, the A.C. voltage spikes consist of practically instantaneous duration, such as 20–40 volt, "needles" emanating from the A.C. sinusoid, with a duration of several microseconds. Similar "needles" appear in the D.C. voltage envelope. Experience has shown that if the attached D.C. load is as low as 5% or even less of the rating of the A.C. source, these phenomena occur. They are highly objectionable since they create electrical noise in both the A.C. and D.C. outputs and, due to the sensitivity of semiconductors to instantaneous overvoltages, often cause their failure. For instance, it has been found that the connection of a 200 a./28 v. uncontrolled D.C. power supply to a conventional 40 kva., 400 c.p.s., 115/200 v. aircraft generator causes a major and detrimental deformation of the A.C. output voltage. If the D.C. voltage is now regulated by pulse width control of the rectification elements, conditions become even worse. Consequently, the latter approach has been tried but at present is not used due to these detrimental effects: (a) the short commutation time of the rectifying semiconductors, which is otherwise desirable; (b) large short-time current transients within the semiconductors during commutation due to minority carrier effects; (c) the relatively large impedances of the A.C. generator and all components connected in series between the source of E.M.F. generation (in the airgap of the generator) and the D.C. terminals. These impedances include the generator impedances, the line impedances leading to the conversion devices and the conversion device impedance itself, such as the transformer (reducing the A.C. voltage of a typical value of 115/200 volt, three-phase, to the desired equivalent D.C. level of 28 volts).

It is an object of this invention to reduce these objectionable voltage deformations to a minimum and obtain A.C. and D.C. generation within one configuration while reducing the overall weight and overall cost, and improve cooling properties of the generator.

Another object of this invention is to provide a relatively inexpensive single magnetic structure duplex generator capable of supplying independently regulated alternating and direct current.

Another object is to provide a duplex generator capable of providing independently regulated alternating current and direct current wherein the distortion of the alternating current wave shape is negligible.

Still another object of the invention is to provide a direct current rectifier and regulator unit having constant voltage and constant current characteristics interrelated to reduce the necessary size of the rectifier components.

Still another object of the invention is to provide a combined rectifier and regulator circuit including an oscillator for providing firing power to a controllable rectifier circuit wherein the oscillator frequency is not critical and wherein disabling the oscillator circuit effectively disconnects the D.C. load from the alternating current source of potential.

The duplex generator in accordance with this invention includes an alternator having a field winding and two separate armature windings, one preferably but not necessarily being a three-phase star winding and the other being a three-phase delta winding. An alternating voltage regulator sensing A.C. voltage, is constructed to control energization of the field winding in accordance with the voltage sensed at the output of one of the armature windings to thus provide a constant voltage alternating current source. The other armature winding is connected to a controllable rectifier circuit including, for example, saturable reactors, silicon controlled rectifiers, or the like. A direct current voltage regulator controls the rectifier circuit in accordance with the voltage sensed at the output of the regulator circuit to thus provide a regulator direct current source. The direct current regulator preferably also senses load current so that it can achieve constant voltage characteristics until a predetermined overload current is sensed, and thereafter provide constant current characteristics with further reduction in D.C. load impedance. If the rectifier circuit includes a silicon controlled rectifier, the direct current regulator preferably includes an oscillator operating at any suitable frequency having a nonharmonic relationship to the armature winding voltage to thus cause a random firing of the controlled rectifiers. This oscillator is preferably provided with a suitable switching device for selectively disabling the oscillator so that the silicon controlled rectifiers can be utilized to effectively disconnect the D.C. load.

A better understanding of the invention may be achieved by referring to the following specification and drawings, the drawings forming a portion of the specification, and wherein.

Figure 1:
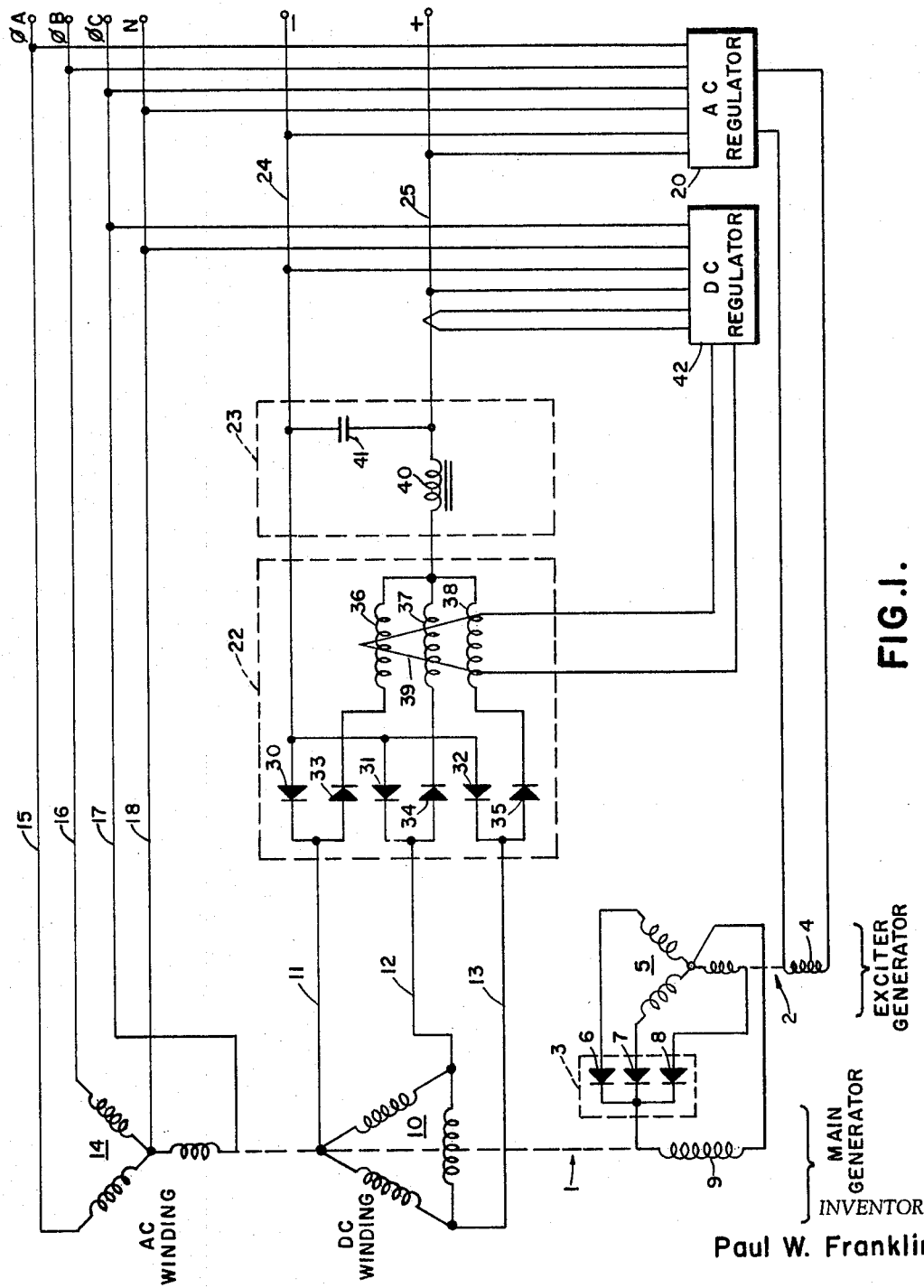
FIG. 1 is a schematic diagram illustrating a duplex generator system in accordance with on embodiment of the invention.
Figure 3:
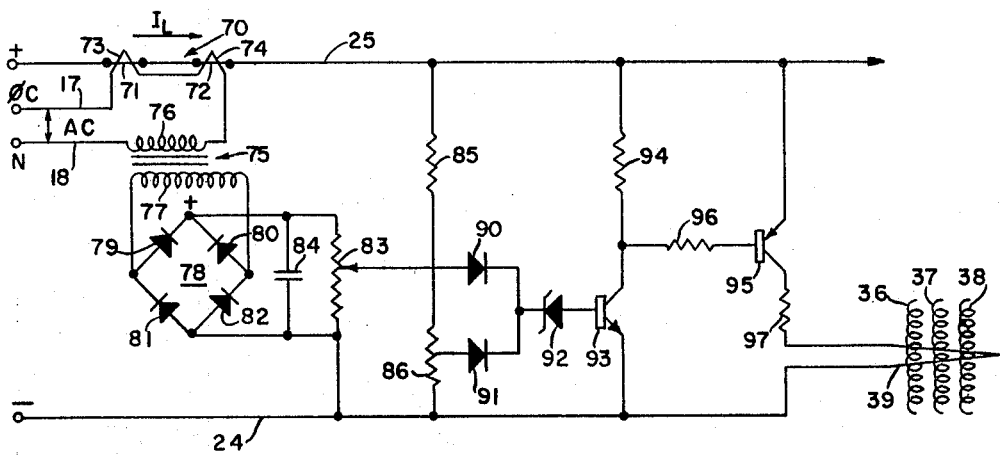
Figure 3A:
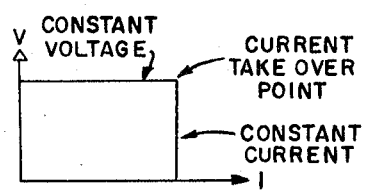
Figure 5:
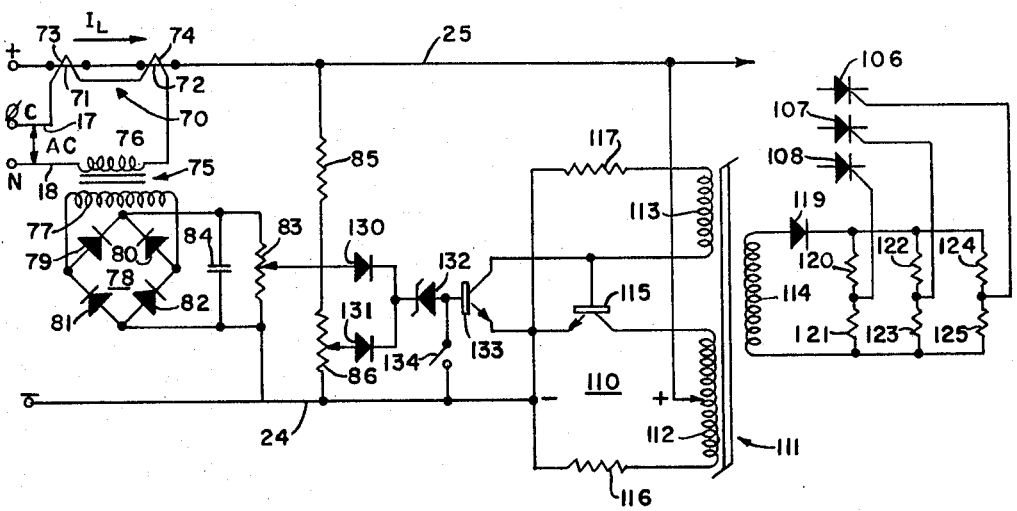

FIG. 3 schematically illustrates a direct current regulator circuit suitable for use in the system illustrated in FIG. 1;

FIG. 3a is a characteristic curve for the regulator circuit illustrated in FIG. 3;

FIG. 4 schematically illustrates a duplex generator system in accordance with another embodiment of the invention; and FIG. 5 schematically illustrates a direct current regulator circuit suitable for use in the system illustrated in FIG. 4.

The alternator used in the duplex generator system in accordance with this invention can be of virtually any desired type so long as it includes a field winding capable of controlling the alternating current output from two separate armature windings. The particular alternator illustrated in FIG. 1 is of the type eliminating the need for slip rings or commutators and includes a main generator 1 and an exciter generator 2 having a common rotor. The two generators are interconnected by means of a set of rotating diodes 3.

Exciter generator 2 has a field winding 4 mounted on the stator, and a star armature winding 5 mounted on the rotor. The main generator has a field winding 9 mounted on the rotor with one end connected to the common cathode junction of semiconductor diodes 6, 7, and 8 also mounted on the rotor. The anodes of the diodes are connected, respectively, to the free ends of star winding 5, whereas the other end of field winding 9 is connected to the neutral point of star winding 5. The main generator 1 also includes a three-phase delta armature winding 10, referred to as the D.C. winding, and a three-phase star winding 14, referred to as the A.C. winding. These armature windings are located on the stator. Preferably, the delta winding 10 is displaced 90 electrical degrees from the star winding to thereby minimize the interaction between these windings. Delta winding 10 is connected to provide a three-phase alternating current output on conductors 11, 12 and 13, and star winding 14 is connected to provide three-phase alternating current output on conductors 15, 16 and 17, conductor 18 being connected to the neutral point of star winding 14.

As is characteristic of alternating current generators, the potential appearing across the armature winding is directly related to the potential appearing across the field winding. Accordingly, the potential appearing across field winding 4 determines the potential appearing across star winding 5 which in turn determines the magnitude of the direct current energization provided to field winding 9. Field winding 9 controls the potential across both the A.C. winding and the D.C. winding. Thus, it should be noted that the potential applied to field winding 4 directly controls the magnitude of alternating current potentials appearing on conductors 11–13 and 15–18.

An A.C. regulator 20 may be of any suitable constant voltage type capable of providing energization to field winding 4 which is related to the potential appearing on conductors 15–18. The A.C. regulator may, for example, be of the type illustrated in patent application Serial No. 145,311, filed October 16, 1961, now Patent No. 3,154,733, in the name of Aloysius W. Pratt, which illustrates a constant voltage A.C. regulator capable of providing controlled direct current energization for a field winding from the alternating current output of an alternator. A.C. regulator 20 can also be of the type illustrated in FIG. 2 which takes advantage of the direct current output of a duplex generator to provide direct current energization to field winding 4 in accordance with the alternating current potential appearing on conductors 15–18. Thus, regardless of the type of A.C. regulator selected, the end result is to maintain the potential on conductors 15–18 substantially constant regardless of load variations.

The D.C. winding, i.e., delta armature winding 10, is connected to the positive and negative D.C. conductors 24 and 25 by means of a controllable rectification circuit 22 and a filter circuit 23. The controllable rectification circuit includes six semiconductors 30–35 interconnected to form a full wave, three-phase bridge circuit. More specifically, conductors 11–13 are connected, respectively, to the cathodes of diodes 30–32, negative conductor 24 being connected directly to the common anode junction of these diodes. Conductors 11–13 are also connected, respectively, to the anodes of diodes 33–35. The cathodes of diodes 33–35 are connected, respectively, to main windings 36–38 of separate saturable reactor units, the other end of each of these windings being connected to the positive conductor 25 via an inductor 40 in the filter unit 23. Inductor 40 forms an L-type filter with a capacitor 41 connected between conductors 24 and 25. In some installations it may be desirable to have more complete control, which can be accomplished by placing three additional saturable reactor windings in series, respectively, with diodes 30–32.

A control winding is associated with each of the main windings 36–38, and each of these control windings is connected in series and illustrated schematically as a single control winding 39. The main windings, control windings, and associated diodes 33–35 form conventional magnetic amplifier circuits capable of controlling the voltage drop across the main windings inversely in accordance with the energization applied to the control winding. Referring to main winding 36, for example, it should be noted that due to diode 33 current flows through the main winding only on alternate half cycles. When current flows through the main winding, the associated magnetic core, preferably of square hysteresis loop material, is driven into one of its saturated states. The associated control winding, wound on the same core, is energized to drive the core toward the opposite state of saturation during the half cycle when current does not flow in the main winding, and thus the core is reset to a degree determined by the energization applied to the control winding. During a subsequent half cycle, when current again flows through the main winding, energy is first absorbed in driving the core back toward saturation, and during this time interval, the main winding presents a very high impedance, and therefore little current flows through the main winding. The time required for the core to reach saturation is dependent upon the degree of reset and is measured in electrical degrees and often referred to as the firing angle. Once the magnetic core has reached saturation, the impedance of the main winding is abruptly reduced and therefore the current flow through the main winding is increased substantially for the remainder of the half cycle. The essential feature of the magnetic amplifier is that the voltage drop across the main winding is inversely proportional to a much smaller current flow through the control winding. Consequently D.C. voltage regulation is obtained by trimming.

A D.C. regulator 42 is utilized to provide a control current through control winding 39 which is directly related to the potential appearing across conductors 24 and 25 so that the potential at the direct current output remains substantially constant. As will be described hereinafter in greater detail, it is also desirable that the D.C. regulator sense the D.C. load current and be operable via the saturable reactors to provide constant voltage operation until a predetermined overload current is sensed, and thereafter provide constant current operation with further increases in load. The reason for the combined constant voltage and constant current characteristics is that this reduces the necessary size of components in controllable rectification circuit 22. In most contemporary control circuit designs, the various components must be capable of withstanding direct short circuit current conditions for a short period of time sufficient to permit protective devices such as circuit breakers to operate. This usually requires that these components be capable of withstanding up to 600% overload. However, if the D.C. regulator circuit provides constant voltage operation up to a predetermined overload such as 250%, and thereafter provides constant current with further increases in load, the components in the controllable rectification circuit 22 need only be capable of withstanding the 250% overload. Under these circumstances, these components would probably be selected to withstand approximately 300% overload so as to provide a suitable safety factor.

Figure 2:
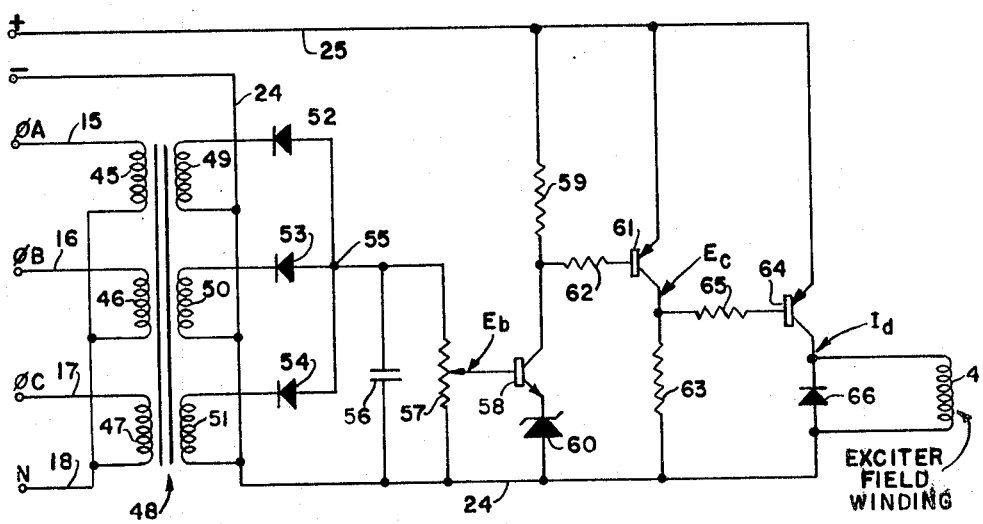
FIG. 2 is a schematic diagram illustrating an alternating current regulator suitable for use in the system shown in FIG. 1.

An A.C. regulator for use in the duplex generator system is illustrated schematically in FIG. 2. This A.C. regulator circuit provides energization to exciter field winding 4 from the direct current output appearing between conductors 24 and 25, this energization being inversely related to the potential appearing on the three-phase conductors 15–18 so as to maintain the three-phase alternating current output potential substantially constant.

One end of each of the primary windings 45, 46 and 47 of a three-phase transformer 48 is connected, respectively, to conductors 15, 16 and 17. The free ends of these primary windings are all connected to neutral conductor 18. One end of secondary winding 49 of three-phase transformer 48 is connected to the anode of a semiconductor diode 52, and in like fashion one end of the other secondary windings 50 and 51 of transformer 48, are connected respectively to the anodes of semiconductor diodes 53 and 54. The remaining free ends of each of these secondary windings is connected to the negative D.C. conductor 24. Diodes 52–54 are all poled in the same direction to provide three-phase half wave rectification and provide a pulsating positive potential at their common anode junction 55 with respect to negative conductor 24. A resistor 57 is connected between junction 55 and the negative conductor, and a capacitor 56 is connected in parallel with this resistor.

Figure 2A:
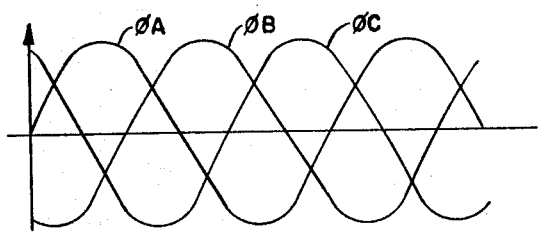
FIGS. 2a–2d show wave shapes appearing at various points in the alternating current regulator illustrated in FIG. 2.
Figure 2B:
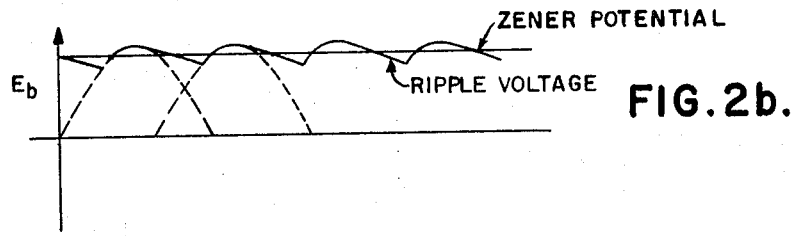

The incoming three-phase signal as it appears on conductors 15–18 is illustrated in FIG. 2a. The three-phase signal is half wave rectified and then smoothed by capacitor 56 so that the signal appearing at the variable tap of resistor 57 is a ripple voltage $E_b$ as illustrated in FIG. 2b.

The base of an NPN type transistor 58 is connected to the variable tap of resistor 57. The collector of transistor 58 is connected to positive conductor 25 via a load resistor 59, and the emitter of the transistor is connected to the cathode of a Zener diode 60, the anode of the Zener diode being connected to negative conductor 24. Transistor 58 becomes conductive whenever the base of the transistor is positive with respect to the emitter, and this transistor is preferably selected so that a very small positive potential drives the transistor into a saturated conductive state. Accordingly, when the potential across the lower portion of resistor 57 exceeds the Zener potential of Zener diode 60, transistor 58 becomes conductive. Under normal operating circumstances, a portion of the ripple voltage $E_b$ exceeds the Zener potential of Zener diode 60 and thus, if the Zener potential is superimposed on the ripple voltage, it appears as is illustrated in FIG. 2b. Transistor 58 becomes fully conductive whenever the ripple voltage exceeds the Zener potential.

Figure 2C:
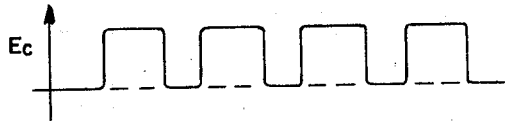

The base of a PNP type transistor 61 is connected to the collector of transistor 58 via a resistor 62. The emitter of transistor 61 is connected to positive conductor 25 and the collector is connected to negative conductor 24 via a load resistor 63. It can be assumed that transistor 61 operates in a switching mode and is therefore non-conductive or fully conductive. The interconnection between transistors 58 and 61 is such that they are always in the same state of conduction. The collector potential $E_c$ of transistor 61 is shown in FIG. 2c. Whenever the ripple voltage $E_b$ exceeds the Zener diode voltage (FIG. 2b), transistors 58 and 61 become conductive and therefore the collector potential $E_c$ becomes positive. The result is a series of positive pulses, each of these pulses having a width corresponding to the period of time during which the ripple voltage exceeds the Zener diode voltage.

Figure 2D:
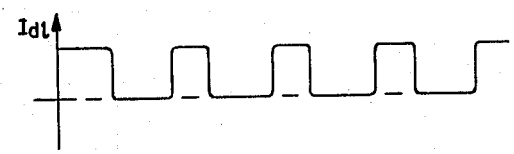

The base of a PNP power transistor 64 is connected to the collector of transistor 61 via a resistor 65. The emitter of this transistor is connected to positive conductor 25, and the collector is connected to negative conductor 24 via exciter field winding 4. A free wheeling semiconductor diode 66 is connected in parallel with field winding 4, the cathode of this diode being connected to the collector of transistor 64 and the anode being connected to negative conductor 24. When the potential $E_c$ is positive, transistor 64 is non-conductive, and when this potential drops to zero, transistor 64 becomes conductive. Accordingly, transistors 61 and 64 are always in opposite states of conductivity. The current flow through the collector of transistor 64 is as illustrated in FIG. 2d. It should be noted that, as the width of voltage pulses in FIG. 2c decreases, the width of the current pulses in FIG. 2d increases, and vice versa. The inductance of field winding 4 resists any voltage changes and diode 66 is poled to provide a low impedance path for current flow as the magnetic field collapses. Therefore, the current flow through field winding 4 remains fairly constant even though current pulses are applied via transistor 64.

The A.C. regulator in FIG. 2 operates to maintain the alternating current output potential on conductors 15–18 substantially constant. If the potential on these conductors tends to increase, a larger portion of ripple voltage $E_b$ (FIG. 2b) would exceed the Zener potential and therefore the width of pulses in FIG. 2c increase and the width of pulses in FIG. 2e decrease. Accordingly, the energization of the field winding is decreased and this in turn causes a decrease in the output potential at armature winding 14, thus compensating for the initial increase. Conversely, if the alternating current output potential tends to decrease, less of the ripple voltage exceeds the Zener potential and therefore the width of pulses in FIG. 2c decreases, the width of pulses in FIG. 2d increases. Additional energy is thus applied to the field winding and the alternator compensates for the decrease in potential. Thus, the A.C. regulator operates in servo fashion to maintain the alternating current output potential substantially constant. The constant output potential can be adjusted by means of the variable tap on resistor 57.

The D.C. regulator 42, FIG. 1, can be of any suitable conventional design. A specific regulator circuit which can be used, however, is illustrated schematically in FIG. 3. This regulator circuit is operative to sense the direct current output voltage appearing between conductors 24 and 25 so as to develop a signal which can be applied to control winding 39 of the saturable reactors to maintain a substantially constant output voltage. It is not necessary, but definitely preferable, that the D.C. regulator also sense the load current which passes through filter circuit 23 and provide a constant current characteristic when a predetermined overload current is sensed, which as previously explained, is conveniently selected at 250% overload.

The current sensing portion of the D.C. regulator includes a double saturable reactor unit 70 having a primary winding 71 and an associated secondary winding 73 wound on one core, and a primary winding 72 and an associated secondary winding 74 wound on a separate core. Primary windings 71 and 72 are connected in series with one another and in series with positive conductor 25 so that the load current $I_L$ passes through the primary windings. Secondary windings 73 and 74 are connected in series with one another and in series with a primary winding 76 of a transformer 75. One end of primary winding 76 and one end of secondary winding 73 are connected, respectively, to conductors 17 and 18 to provide alternating current potential to this series circuit. The saturable reactors are connected to saturate during opposite half cycles so that the alternating current signal applied to the saturable reactors is clipped during both half cycles, resulting in a complex wave which has a generally square wave configuration as it appears across primary winding 76. The peak to peak magnitude of this signal is directly proportional to the current flow $I_L$.

The ends of the secondary winding 77 of transformer 75 are connected to the input of a full wave bridge rectifier circuit 78 made up of four semiconductor diodes 79–82. A resistor 83 is connected across the output terminals of bridge 78, with the negative terminal of the bridge also being connected to negative conductor 24. A capacitor 84 is connected in parallel with resistor 83 to filter the output from bridge 78. Accordingly, a relatively smooth direct current potential appears across resistor 83 which is directly proportional to the current flow $I_L$ in positive conductor 25.

A resistor 86 is connected in series with a resistor 85, this series of combination of resistors being connected between conductors 24 and 25. The potential appearing across resistor 86 is therefore directly proportional to the potential between conductors 24 and 25.

The variable taps associated with resistors 83 and 86 are connected, respectively, to the anodes of semiconductor diodes 90 and 91, the cathodes of these diodes being connected to the cathode of a Zener diode 92. The base of an NPN transistor 93 is connected to the anode of Zener diode 92. The emitter of transistor 93 is connected to negative conductor 24 and the collector is connected to positive conductor 25 via a load resistor 94. Transistor 93 is preferably of the type which becomes fully conductive when the base is slightly positive with respect to the emitter. The base of a PNP output transistor 95 is connected to the collector of transistor 93 through a resistor 96, and the emitter thereof is connected directly to positive conductor 25. Control winding 39 is connected in series with a resistor 97, this series combination being connected between the collector of transistor 95 and negative conductor 24.

Transistors 93 and 95 both become conductive when the potential at the common cathode junctions of diodes 90 and 91 exceed the Zener potential of Zener diode 92. Under these circumstances, current flow passes through the emitter-collector circuit of transistor 95 and through control winding 39. It should be noted that the higher of the two voltages appearing at the variable taps of resistors 83 and 86 is the one affecting the conductive state of transistor 93, since either diode 90 or 91 is back biased unless these two voltages happen to be the same. If the voltage from resistor 86 is predominant, diode 91 is forward biased and the regulator circuit provides constant voltage characteristics, whereas if the voltage from resistor 83 is predominant, diode 90 is forward biased and the regulator circuit provides constant current characteristics.

Assume first that the load current $I_L$ is moderate and that the regulator is therefore operating in the constant voltage characteristic. The adjustable tap on resistor 86 is adjusted so that when the D.C. output potential is below the desired value, the potential at the adjustable tap does not exceed the Zener voltage of Zener diode 92, and, that therefore, transistors 93 and 95 are non-conductive. Under these circumstances, no current flows through control winding 39, and as previously explained with regard to FIG. 1, there is no reset in the saturable reactors and therefore no substantial potential drop across the reactors. As soon as the potential exceeds the desired voltage, the potential at the adjustable tap exceeds the Zener potential and current begins to flow through Zener diode 92 thus rendering transistors 93–95 conductive, to thereby permit current flow through control winding 39. This causes the saturable reactors to be partially reset and therefore the saturable reactors provide an increased impedance to reduce the output voltage. In this on-off manner, the D.C. regulator circuit provides a constant output voltage and operates along the constant voltage portion of the characteristic curve, as shown in FIG. 3a. Filter circuit 23, shown in FIG. 1 is designed to filter the ripple from the rectification circuit and the voltage fluctuations due to the on-off type operation.

The variable tap on resistor 83 is adjusted so that when the current flow through positive conductor 25 exceeds a predetermined value, such as 250% overload, the voltage across the lower portion of resistor 83 will exceed that appearing across the lower portion of resistor 86. Under these circumstances, diode 90 becomes forward biased and transistors 93 and 95 are rendered conductive whenever the current tends to rise above the predetermined level, thus increasing the impedance of the saturable reactors via the control winding 39 to compensate for the increased current. The D.C. regulator therefore operates on the constant current portion of the curve shown in FIG. 3a. The predetermined constant current is varied by adjusting the tap on resistor 83.

Another embodiment of the invention is schematically illustrated in FIG. 4. The alternator, the A.C. regulator, the D.C. filter circuit, and the output conductors are essentially the same as those previously described in FIG. 1, and therefore, like reference numerals are employed. The essential change in this embodiment is in the controllable rectification circuit 100, which utilizes silicon controlled rectifiers in place of the saturable reactors in controllable rectification circuit 22 (FIG. 1). The associated D.C. regulator 101 is modified somewhat to provide the proper firing pulses for the controlled rectifiers. The over-all operation of the duplex generator system in FIG. 4 is essentially the same as that previously described with respect to FIG. 1.

The controllable rectification circuit 100 includes three semiconductor diodes and three silicon controlled rectifiers interconnected to form a three-phase full wave bridge. More specifically, the cathodes of diodes 103–105 are connected to conductors 11–13, respectively, the anodes of these diodes being connected to the negative conductor 24. The anodes of silicon controlled rectifiers 106–108 are connected to conductors 11–13, respectively, and the cathodes of these controlled rectifiers are connected to positive conductor 25 via inductor 40 in filter circuit 23. Diodes 103–105 can be replaced with silicon controlled rectifiers if desired.

Silicon controlled rectifiers are four-layer PNPN internally regenerative semiconductors. Normally, the controlled rectifier presents a high impedance to current flow in either direction. However, when a positive firing potential is applied at the gate element with respect to the cathode, the controlled rectifier becomes conductive in the forward direction and thereafter remains conductive even though the firing potential is removed. The controlled rectifier remains conductive until the anode-cathode current falls below a predetermined holding level, such as occurs when the applied anode-cathode potential reverses polarity. Since an alternating current signal is applied to controlled rectifiers 106–108, these controlled rectifiers can be rendered conductive only if a firing potential is applied to the gate element during the half cycle when the anode is positive with respect to the cathode, and will thereafter remain conductive until the completion of that half cycle.

D.C. regulator 101 can be of any known type capable of providing firing pulses to the controlled rectifiers in a manner which maintains the voltage between conductors 24 and 25 substantially constant. Preferably, the D.C. regulator also provides constant current regulation when the load current exceeds a predetermined value.

A D.C. regulator, suitable for use in the system illustrated in FIG. 4, is shown schematically in FIG. 5. The principal component of this regular circuit is a saturable reactor oscillator 110 including a saturable transformer 111 having a center tapped main winding 112, a feedback winding 113, and an output winding 114. The center tap of main winding 112 is connected to positive conductor 25. One end of the main winding is connected to the negative conductor through a resistor 116, and the other end is connected to the negative conductor via the collector-emitter circuit of an NPN transistor 115. One end of feedback winding 113 is connected to the base of transistor 115, and the other end is connected to the emitter of transistor 115 via a resistor 117.

Disregarding, for the moment, the other connections between the base and emitter of transistor 115, the operation of oscillator 110 can be summarized as follows. When conductors 24 and 25 are initially energized, current begins to flow from the center tap of main winding 112 through resistor 116 to the negative conductor. The potential developed across feedback 113 is of a polarity which maintains transistor 115 non-conductive. Operation continues in this manner until the core of saturable transformer 111 becomes saturated, preventing any further changes of flux in the core. This generates an "inductive kick" voltage in feedback winding 113, which is of the opposite polarity and therefore renders transistor 115 partially conductive. The transistor is thereafter driven into saturation by positive feedback as current flows from the positive conductor, through main winding 112, the collector-emitter circuit of transistor 115 to the negative conductor. When the core of saturable transformer 111 again reaches saturation, this time in the opposite direction, transistor 115 becomes non-conductive. The cycle then repeats as current again begins to flow through resistor 116. Accordingly, a substantially square wave signal appears across output winding 114 when saturable reactor oscillator 110 is operating.

The gate element of controlled rectifier 108 is connected to a voltage divider formed by resistors 120 and 121; the gate element of controlled rectifier 107 is connected to a voltage divider formed by resistors 122 and 123; and the gate element of controlled rectifier 106 is connected to a voltage divider formed by resistors 124 and 125. These voltage dividers are connected in parallel with one another and are connected across output winding 114 in series with a semiconductor diode 119. Diode 119 is poled in the direction to provide positive pulses to the gate elements as is required for firing controlled rectifiers 106–108.

The operating frequency of oscillator 110 is not particularly critical. If, for example, the alternator system is a 400-cycle system, the oscillator can operate at virtually any frequency between 500 and 1,000 cycles. When the oscillator is operative, it causes a somewhat random firing of the controlled rectifiers, i.e., the controlled rectifiers are not necessarily conductive for the same portion of a half cycle. However, if the oscillator is disabled, the controlled rectifiers completely block current flow.

The portions of the D.C. regulator circuit which are utilized to sense the current flow $I_L$ in positive conductor 25, and the potential between conductors 24 and 25, are essentially the same as previously described in FIG. 3, and therefore like reference numerals are employed. The potential appearing across resistor 83 is directly proportional to the current flow $I_L$, and the potential appearing across resistor 86 is directly proportional to the potential between conductors 24 and 25.

The variable tap of resistor 83 is connected to the anode of a semiconductor diode 130, and the variable tap of resistor 86 is connected to the anode of a semiconductor diode 131. The cathodes of these diodes are both connected to the cathode of a Zener diode 130, the anode of the Zener diode being connected to the base of a transistor 133. Transistor 133 is of the NPN type and has its collector-emitter circuit connected across the base-emitter circuit of transistor 113. The circuit arrangement is such that either diode 130 or diode 131 is back biased and therefore the higher of the two potentials appearing on the variable taps of resistors 83 and 86 is effective to control the conductive state of transistor 133. When transistor 133 is conductive, it short-circuits the base-emitter circuit of transistor 113 and thereby disables oscillator circuit 110.

The operating characteristics of the D.C. regulator in FIG. 5 are essentially as illustarted in FIG. 3a, in that the regulator circuit maintains constant voltage until a predetermined load current is sensed, and thereafter maintains constant current with further load increases. Assume first that the load current $I_L$ is nominal, and that therefore the potential appearing across resistor 86 determines the conductive state of transistor 133. The adjustable tap on resistor 86 is adjusted so that when the potential appearing between conductors 24 and 25 is below the desired value, Zener diode 130 is not conductive and therefore transistor 133 is also non-conductive. Under these circumstances, oscillator 110 is operative and firing power is supplied to controlled rectifiers 106–108 so that the maximum current can pass through conductors 24 and 25 to the load. As soon as the D.C. output potential exceeds the desired value, Zener diode 132 becomes conductive, in turn rendering transistor 133 conductive to disable oscillator 110. Under these circumstances, the controlled rectifiers receive no firing pulses and therefore no additional current can flow through the controlled rectifiers until the potential again drops below the desired value, at which time the oscillator is again rendered operative. Filter circuit 23 (FIG. 4) is of any suitable type designed to filter out the ripple voltage caused by the full wave rectification, and to also filter out the voltage fluctuation caused by the on-off type regulator action.

The adjustable tap on resistor 83 is adjusted so that when the load current $I_L$ exceeds a predetermined value, diode 131 will become back biased and the potential from resistor 83 will control the conductive state of transistor 133. At any time that the load current $I_L$ exceeds the desired maximum value of load current, the potential across resistor 83 is sufficient to cause Zener diode 132 to become conductive and in turn render transistor 133 conductive. Under these circumstances, oscillator 110 is disabled and remains disabled until the load current again falls below the desired value.

A switch 134 can be connected between the base and emitter of transistor 133 to selectively render this transistor non-conductive. Thus, whenever switch 134 is closed, transistor 133 cannot become conductive and therefore oscillator 110 becomes disabled, removing firing power from controlled rectifiers 106–108. Shortly thereafter, at the completion of the respective half cycles, controlled rectifiers become non-conductive and in this manner effectively disconnect the load from the alternator. The advantage of this type of interruption is that the controlled rectifiers automatically interrupt at the instant the alternating current signal changes polarity, and therefore interruption always occurs at a point of zero voltage, thus eliminating severe potential stresses which usually occur during interruptions.

While only a few embodiments of the present invention have been illustrated in detail, it should be observed that there are many possible variations within the scope of this invention. The invention is more particularly defined in the appended claims.

What is claimed is:
1. In a duplex generator, the combination of
    an alternator having a stator and a rotor,
        a field winding on said rotor, and
        a first and second armature winding on said stator;
    a first regulator circuit connected to energize said field winding controlling the potential across the first armature winding in accordance with the potential sensed across said first armature winding to thereby provide a source of regulated alternating current, and simultaneously through said field winding to control the potential on said second armature winding;
    a controllable rectification circuit connected to said second armature winding; and
    a second regulator circuit connected to control the amount of rectification in said rectification circuit in accordance with the potential sensed at the output of said rectification circuit to thereby provide a source of regulated direct current.

2. A duplex generator in accordance with claim 1 wherein one of said first and second armature windings is a three-phase star winding and the other is a three-phase delta winding and the delta winding is displaced approximately 90 electrical degrees from said second star winding to thereby minimize undesired interaction between these windings.

3. The duplex generator of claim 1, in which mutual interference between the regulating circuits is reduced by using the same number of phases in said first and second armature winding and providing a displacement of approximately 90 electrical degrees between these windings.

4. A duplex generator for providing independently regulated A.C. and D.C. power, the combination of
   an alternator having a stator and a rotor,
      a three-phase star armature winding and
      a three-phase delta armature winding on said stator, and
      a field winding on said rotor for controlling the output potential of said armature windings;
   a first regulator circuit for sensing the potential across said star winding and for controlling the energization of said field winding so as to maintain the potential across said star winding substantially constant, and for simultaneously controlling the alternating current potential across said delta winding;
   a rectification circuit connected to said delta winding and including means for controlling the output potential from the same; and
   a second regulator circuit for sensing the output potential from said rectification circuit and being connected, via said means, to maintain the direct current output of said rectification circuit substantially constant within a selected range of current.

5. In a duplex generator for providing independently regulated A.C. and D.C. power to a load, the combination of
   an alternator having
      a field winding, and
      a first and second armature winding;
   a first regulator circuit connected to energize said field winding and thus control the potential across said first armature winding in accordance with the potential sensed across said first armature winding to thereby provide a source of regulated alternating current, and simultaneously to control the potential across said second armature winding;
   a full wave rectifying circuit
      connected to said second armature winding, and including at least one silicon controlled rectifier operative to vary the output potential from said rectifying circuit;
   a filter circuit connected to smooth the pulsating output from said rectifying circuit; and
   a second regulator circuit including an electrical oscillator connected to said load and connected to provide firing pulses to said silicon controlled rectifier in accordance with the potential sensed at the output of said filter circuit to thereby provide a source of regulated direct current.

6. A duplex generator in accordance with claim 5 further including circuit means for selectively disabling said oscillator to effectively disconnect the load from said second armature winding.

7. In a duplex generator for providing independently regulated A.C. and D.C. power, the combination of
   an alternator having a stator and a rotor,
      a field winding on said rotor, and
      a first and second armature winding on said stator;
   a first regulator circuit connected to energize said field winding and thus the potential across said first winding in accordance with the potential sensed across said first armature winding to thereby provide a source of regulated alternating current, and simultaneously through said field winding to control the potential across said second armature winding;
   a full wave rectifying circuit
      connected to said second armature winding, and including at least one controlled rectifier operative to vary the output potential from said rectifying circuit;
   a filter circuit connected to smooth the pulsating output from said rectifying circuit; and
   a second regulator circuit including
      an electrical oscillator providing an output signal having a nonharmonic relationship with respect to the signal appearing across said second armature winding;
      circuit means for connecting said oscillator output signal to said controlled rectifier causing the latter to fire randomly when said oscillator is operative, and
      other circuit means for selectively enabling and disabling said oscillator in accordance with the potential appearing across the output of said filter circuit.

8. In a duplex generating system, a main generator and an exciter generator interconnected therewith, each having a stator and a common rotor; said exciter generator having a first field winding mounted on its stator and a first star armature winding mounted on said rotor; said main generator having a second field winding on said rotor and interconnected with said first star armature winding of said exciter generator, and a second multi-phase star armature winding and a delta multi-phase armature winding mounted on its stator; a first regulation circuit connected to energize the first field winding, and thus the second field winding through said first star winding connected thereto, to control the potential across said second star winding in accordance with the voltage sensed in the output of said second star winding to provide a regulated alternating current source, and simultaneously to control the alternating current potential across said delta winding; a controllable rectification circuit connected to said delta winding for rectifying the alternating potential across that winding; and a second regulation circuit connected to control the rectification circuit in accordance with the voltage sensed at the output thereof to provide an independent regulated alternating current source.

References Cited by the Examiner

UNITED STATES PATENTS

| | | | |
|---|---|---|---|
| 2,236,880 | 4/1941 | Perry | 322—59 |
| 2,912,637 | 11/1959 | Barnes et al. | 323—22 |
| 2,920,240 | 1/1960 | MacKlem. | |
| 2,945,171 | 7/1960 | Louden | 321—25 |
| 3,121,838 | 2/1964 | Mozic | 322—90 |

OTHER REFERENCES

Marconi Review, First Quarter 1962, page 86.

MILTON O. HIRSHFIELD, *Primary Examiner.*

LLOYD McCOLLUM, *Examiner.*

L. R. CASSETT, J. J. SWARTZ, *Assistant Examiners.*